US008856438B1

(12) United States Patent
Warner et al.

(10) Patent No.: US 8,856,438 B1
(45) Date of Patent: Oct. 7, 2014

(54) DISK DRIVE WITH REDUCED-SIZE TRANSLATION TABLE

(75) Inventors: Nicholas M. Warner, Livermore, CA (US); Marcus A. Carlson, Berthoud, CO (US); David C. Pruett, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 156 days.

(21) Appl. No.: 13/316,039

(22) Filed: Dec. 9, 2011

(51) Int. Cl.
*G06F 12/00* (2006.01)

(52) U.S. Cl.
USPC ........... 711/112; 711/202; 711/209; 711/205; 711/206

(58) Field of Classification Search
USPC .......................... 711/202, 209, 205, 206, 112
See application file for complete search history.

(56) References Cited

U.S. PATENT DOCUMENTS

| | | | |
|---|---|---|---|
| 4,769,770 A | | 9/1988 | Miyadera et al. |
| 4,992,936 A | * | 2/1991 | Katada et al. ............... 711/209 |
| 5,121,480 A | | 6/1992 | Bonke et al. |
| 5,293,282 A | | 3/1994 | Squires et al. |
| 5,613,066 A | | 3/1997 | Matsushima et al. |
| 5,983,309 A | | 11/1999 | Atsatt et al. |
| 6,092,231 A | | 7/2000 | Sze |
| 6,105,104 A | | 8/2000 | Guttmann et al. |
| 6,182,250 B1 | | 1/2001 | Ng et al. |
| 6,182,550 B1 | | 2/2001 | Brewington et al. |
| 6,202,121 B1 | | 3/2001 | Walsh et al. |
| 6,240,501 B1 | * | 5/2001 | Hagersten ............... 711/202 |
| 6,324,604 B1 | | 11/2001 | Don et al. |
| 6,339,811 B1 | | 1/2002 | Gaertner et al. |
| 6,411,454 B1 | | 6/2002 | Monroe, III |
| 6,556,365 B2 | | 4/2003 | Satoh |
| 6,574,774 B1 | | 6/2003 | Vasiliev |
| 6,636,049 B1 | | 10/2003 | Lim et al. |
| 6,690,538 B1 | | 2/2004 | Saito et al. |
| 6,728,054 B2 | | 4/2004 | Chng et al. |
| 6,735,032 B2 | | 5/2004 | Dunn et al. |
| 6,772,274 B1 | | 8/2004 | Estakhri |
| 6,829,688 B2 | | 12/2004 | Grubbs et al. |
| 6,886,068 B2 | | 4/2005 | Tomita |
| 6,895,468 B2 | | 5/2005 | Rege et al. |
| 6,901,479 B2 | | 5/2005 | Tomita |
| 6,920,455 B1 | | 7/2005 | Weschler |
| 6,956,710 B2 | | 10/2005 | Yun et al. |
| 6,967,810 B2 | | 11/2005 | Kasiraj et al. |
| 6,980,386 B2 | | 12/2005 | Wach et al. |

(Continued)

FOREIGN PATENT DOCUMENTS

WO 2009/102425 8/2009

OTHER PUBLICATIONS

Amer, Ahmed et al. (May 2010) "Design Issue for a Shingled Write Disk System" 26th IEEE Symposium on Massive Storage Systems and Technologies: Research Track.

(Continued)

*Primary Examiner* — Mardochee Chery

(57) ABSTRACT

A disk drive is disclosed that utilizes an additional address mapping layer between logical addresses used by a host system and physical locations in the disk drive. Physical locations configured to store metadata information can be excluded from the additional address mapping layer. As a result, a reduced size translation table can be maintained by the disk drive. Improved performance, reduced costs, and improved security can thereby be attained.

19 Claims, 6 Drawing Sheets

(56) References Cited

U.S. PATENT DOCUMENTS

| | | |
|---|---|---|
| 6,992,852 B1 | 1/2006 | Ying et al. |
| 7,012,771 B1 | 3/2006 | Asgari et al. |
| 7,035,961 B2 | 4/2006 | Edgar et al. |
| 7,046,471 B2 | 5/2006 | Meyer et al. |
| 7,076,391 B1 | 7/2006 | Pakzad et al. |
| 7,082,007 B2 | 7/2006 | Liu et al. |
| 7,089,355 B2 | 8/2006 | Auerbach et al. |
| 7,113,358 B2 | 9/2006 | Zayas et al. |
| 7,120,726 B2 | 10/2006 | Chen et al. |
| 7,155,448 B2 | 12/2006 | Winter |
| 7,199,981 B2 | 4/2007 | Zabtcioglu |
| 7,254,671 B2 | 8/2007 | Haswell |
| 7,283,316 B2 | 10/2007 | Chiao et al. |
| 7,298,568 B2 | 11/2007 | Ehrlich et al. |
| 7,330,323 B1 | 2/2008 | Singh et al. |
| 7,343,517 B2 | 3/2008 | Miller et al. |
| 7,408,731 B2 | 8/2008 | Uemura et al. |
| 7,412,585 B2 | 8/2008 | Uemura |
| 7,436,610 B1 | 10/2008 | Thelin |
| 7,436,614 B2 | 10/2008 | Uchida |
| 7,440,224 B2 | 10/2008 | Ehrlich et al. |
| 7,486,460 B2 | 2/2009 | Tsuchinaga et al. |
| 7,490,212 B2 | 2/2009 | Kasiraj et al. |
| 7,509,471 B2 | 3/2009 | Gorobets |
| 7,516,267 B2 | 4/2009 | Coulson et al. |
| 7,529,880 B2 | 5/2009 | Chung et al. |
| 7,539,924 B1 | 5/2009 | Vasquez et al. |
| 7,603,530 B1 | 10/2009 | Liikanen et al. |
| 7,647,544 B1 | 1/2010 | Masiewicz |
| 7,669,044 B2 | 2/2010 | Fitzgerald et al. |
| 7,685,360 B1 | 3/2010 | Brunnett et al. |
| 7,840,878 B1 | 11/2010 | Tang et al. |
| 7,860,836 B1 | 12/2010 | Natanzon et al. |
| 7,885,921 B2 | 2/2011 | Mahar et al. |
| 7,900,037 B1 | 3/2011 | Fallone et al. |
| 7,982,993 B1 | 7/2011 | Tsai et al. |
| 8,006,027 B1 | 8/2011 | Stevens et al. |
| 8,031,423 B1 | 10/2011 | Tsai et al. |
| 8,116,020 B1 | 2/2012 | Lee |
| 8,179,627 B2 | 5/2012 | Chang et al. |
| 8,194,340 B1 | 6/2012 | Boyle et al. |
| 8,194,341 B1 | 6/2012 | Boyle |
| 8,341,339 B1 | 12/2012 | Boyle et al. |
| 8,443,167 B1 | 5/2013 | Fallone et al. |
| 8,560,759 B1 | 10/2013 | Boyle et al. |
| 8,687,306 B1 | 4/2014 | Coker |
| 8,693,133 B1 | 4/2014 | Lee et al. |
| 8,699,185 B1 | 4/2014 | Teh |
| 2001/0042166 A1 | 11/2001 | Wilson et al. |
| 2003/0065872 A1 | 4/2003 | Edgar et al. |
| 2003/0220943 A1 | 11/2003 | Curran et al. |
| 2004/0019718 A1 | 1/2004 | Schauer et al. |
| 2004/0109376 A1 | 6/2004 | Lin |
| 2005/0069298 A1 | 3/2005 | Kasiraj et al. |
| 2005/0071537 A1 | 3/2005 | New et al. |
| 2005/0138265 A1 | 6/2005 | Nguyen et al. |
| 2005/0144517 A1 | 6/2005 | Zayas |
| 2005/0157416 A1 | 7/2005 | Ehrlich et al. |
| 2006/0090030 A1 | 4/2006 | Ijdens et al. |
| 2006/0112138 A1 | 5/2006 | Fenske et al. |
| 2006/0117161 A1 | 6/2006 | Venturi |
| 2006/0181993 A1 | 8/2006 | Blacquiere et al. |
| 2007/0016721 A1 | 1/2007 | Gay |
| 2007/0067603 A1 | 3/2007 | Yamamoto et al. |
| 2007/0174582 A1 | 7/2007 | Feldman |
| 2007/0204100 A1 | 8/2007 | Shin et al. |
| 2007/0226394 A1 | 9/2007 | Noble |
| 2007/0245064 A1 | 10/2007 | Liu |
| 2007/0288686 A1 | 12/2007 | Arcedera et al. |
| 2007/0294589 A1 | 12/2007 | Jarvis et al. |
| 2008/0098195 A1 | 4/2008 | Cheon et al. |
| 2008/0104308 A1 | 5/2008 | Mo et al. |
| 2008/0183955 A1 | 7/2008 | Yang et al. |
| 2008/0195801 A1 | 8/2008 | Cheon et al. |
| 2008/0256287 A1 | 10/2008 | Lee et al. |
| 2008/0256295 A1 | 10/2008 | Lambert et al. |
| 2008/0270680 A1 | 10/2008 | Chang |
| 2008/0307192 A1 | 12/2008 | Sinclair et al. |
| 2009/0019218 A1 | 1/2009 | Sinclair et al. |
| 2009/0043985 A1 | 2/2009 | Tuuk et al. |
| 2009/0055620 A1 | 2/2009 | Feldman et al. |
| 2009/0063548 A1 | 3/2009 | Rusher et al. |
| 2009/0119353 A1 | 5/2009 | Oh et al. |
| 2009/0150599 A1 | 6/2009 | Bennett |
| 2009/0154254 A1 | 6/2009 | Wong et al. |
| 2009/0164535 A1 | 6/2009 | Gandhi et al. |
| 2009/0164696 A1 | 6/2009 | Allen et al. |
| 2009/0187732 A1 | 7/2009 | Greiner et al. |
| 2009/0193184 A1 | 7/2009 | Yu et al. |
| 2009/0198952 A1 | 8/2009 | Khmelnitsky et al. |
| 2009/0204750 A1 | 8/2009 | Estakhri et al. |
| 2009/0222643 A1 | 9/2009 | Chu |
| 2009/0240873 A1 | 9/2009 | Yu et al. |
| 2009/0271581 A1 | 10/2009 | Hinrichs, Jr. |
| 2009/0276604 A1 | 11/2009 | Baird et al. |
| 2010/0011275 A1 | 1/2010 | Yang |
| 2010/0061150 A1 | 3/2010 | Wu et al. |
| 2010/0161881 A1 | 6/2010 | Nagadomi et al. |
| 2010/0169543 A1 | 7/2010 | Edgington et al. |
| 2010/0169551 A1 | 7/2010 | Yano et al. |
| 2010/0208385 A1 | 8/2010 | Toukairin |
| 2011/0167049 A1 | 7/2011 | Ron |
| 2011/0304935 A1 | 12/2011 | Chang et al. |

OTHER PUBLICATIONS

Rosenblum, (Jun. 1992) "The Design and Implementation of a Log-structured File System", EECS Department, University of California, Berkeley, Technical Report No. UCB/CSD-92-696, pp. 1-93.

Rosenblum, Mendel and Ousterhout, John K. (Feb. 1992), "The Design and Implementation of a Log-Structured File System." ACM Transactions on Computer Systems, vol. 10, Issue 1, pp. 26-52.

Definition of adjacent, Merriam-Webster Dictionary, retrieved from http://www.merriam-webster.com/dictionary/adjacent on Oct. 30, 2013 (1 page).

Re:Hard drive Inner or Outer tracks???, Matthias99, Apr. 12, 2004, retrieved from http://forums.anandtech.com/showthread.php?p=11055300 on Oct. 29, 2013.

You Don't Know Jack about Disks, Dave Anderson, Seagate Technologies, Queue—Storage Queue, vol. 1, issue 4, Jun. 2003, pp. 20-30 (11 pages).

* cited by examiner

| | K | L | M | N | O | P | Q | R |
|---|---|---|---|---|---|---|---|---|
| A | Track Position | ABA ShABA | ABA ShABA | ABA ShABA | ABA ShABA | ABA ShABA | ABA ShABA | ABA ShABA |
| B | 0 – 0.5 | 0 None | 1 0 | 2 1 | 3 2 | 4 3 | 5 4 | 6 5 |
| C | 0.5 – 1 | 7 None | 8 6 | 9 7 | 10 8 | 11 9 | 12 10 | 13 11 |
| D | 1 – 1.5 | 14 None | 15 12 | 16 13 | 17 14 | 18 15 | 19 16 | 20 17 |
| E | 1.5 – 2 | 21 None | 22 18 | 23 19 | 24 20 | 25 21 | 26 22 | 27 23 |
| F | 2 – 2.5 | 28 None | 29 24 | 30 25 | 31 26 | 32 27 | 33 28 | 34 29 |
| G | 2.5 – 3 | 35 None | 36 30 | 37 31 | 38 32 | 39 33 | 40 34 | 41 35 |

FIGURE 3

| A | K<br>Logical Block Address | L<br>Absolute Block Address | M<br>LBA Count |
|---|---|---|---|
| B | 100 | 1 | 3 |
| C | 103 | 5 | 2 |
| D | 105 | 8 | 6 |
| E | 111 | 15 | 6 |
| F | 117 | 22 | 6 |
| G | 123 | 29 | 2 |

*FIGURE 4B*

| A | K<br>Logical Block Address | L<br>Shingled Absolute Block Address | M<br>LBA Count |
|---|---|---|---|
| B | 100 | 0 | 3 |
| C | 103 | 4 | 22 |

*FIGURE 4C*

DISK DRIVE WITH REDUCED-SIZE TRANSLATION TABLE

BACKGROUND

1. Technical Field

This disclosure relates to disk drives and data storage systems for computer systems. More particularly, the disclosure relates to systems and methods for reducing the size of translation tables used by a disk drive or other data storage system.

2. Description of the Related Art

Disk drives typically comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Disk drive capacity has grown by nearly six orders of magnitude since the introduction of magnetic disk storage in 1956. Current magnetic disk drives that use perpendicular recording are capable of storing as much as 400 Gbit/in$^2$. However, this is rapidly approaching the density limit of about 1 Tbit/in$^2$ (1000 Gbit/in$^2$) due to the superparamagnetic effect for perpendicular magnetic recording. Accordingly, new approaches for improving storage density are needed.

BRIEF DESCRIPTION OF THE DRAWINGS

Systems and methods that embody the various features of the invention will now be described with reference to the following drawings, in which:

FIG. 3 illustrates a memory map according to one embodiment of the invention.

FIG. 4B illustrates a translation table corresponding to the memory map of FIG. 4A according to one embodiment of the invention.

FIG. 4C illustrates a reduced size translation table corresponding to the memory map of FIG. 4A according to one embodiment of the invention.

DETAILED DESCRIPTION OF SPECIFIC EMBODIMENTS

Figure 1:
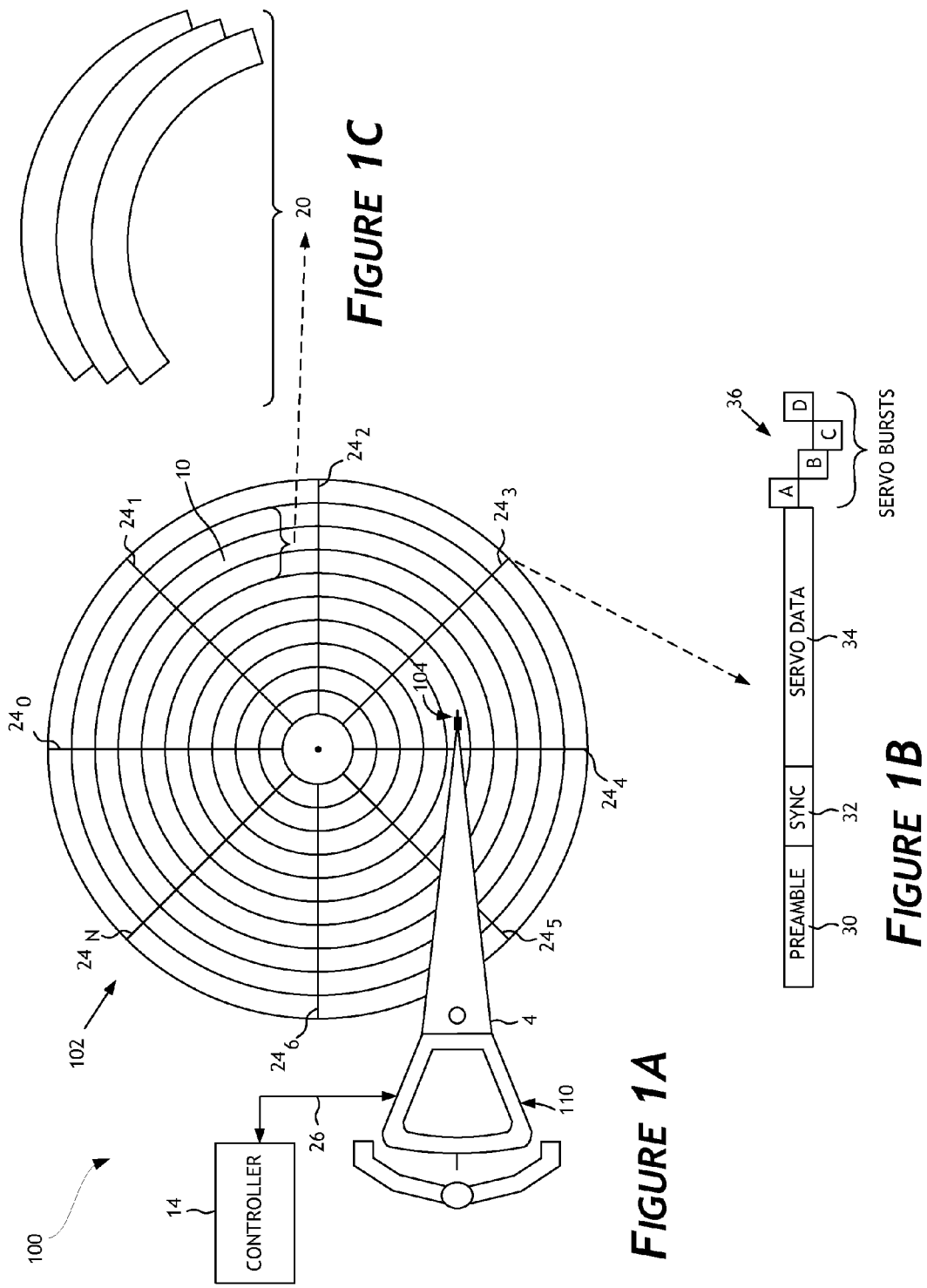
FIG. 1A illustrates a disk drive according to one embodiment of the invention.
FIG. 1B illustrates the format of a servo sector according to one embodiment of the invention.
FIG. 1C illustrates shingled tracks according to one embodiment of the invention.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Shingled writing can improve the density of magnetic disk storage. Because writing data to a magnetic medium generally requires a stronger magnetic field than reading data from the magnetic medium, adjacent data tracks can be partially overlapped or "shingled" during writing. This can be achieved by using a wider and stronger magnetic field when writing data as compared to the magnetic field used when reading data. As a result, shingled writing allows for narrower tracks, which can increase the data density by a factor of about 2.3 or higher. Disk drives that utilize shingled writing are referred to as "shingled disk drives" or "shingled hard drives" throughout this disclosure.

While shingled disk drives permit random access data reading, writing is performed sequentially because writing to a single track can affect (e.g., partially or fully overwrite) data in one or more adjacent tracks. For some shingled disks, the number of affected neighboring tracks can be between 4 and 8. Accordingly, shingled disks drives provide random read access and sequential write access.

To prevent inter-track interference, shingled disk drives can be configured to write data in tracks sequentially in one direction (e.g., from the outer diameter toward the inner diameter of a disk platter) so that a previously written track is overwritten only by the next adjacent track. A shingled disk drive can implement a log-structured file system (LFS), in which write operations progress in the same radial direction so that the data tracks can overlap. New data can be written to the head of a circular buffer (e.g., current data track). During garbage collection, valid data can be relocated from the tail of the buffer (e.g., preceding data tracks) to the head of the buffer in order to free space for new data to be written.

Shingled disk drives can further utilize one or more translation tables that map logical addresses used by a host system to access a disk drive to physical locations or addresses in the disk drive. For example, the host can access the disk drive (e.g., to store and/or retrieve data) as a linear array of logical block addresses (LBAs), and the disk drive can utilize a translation table to map the logical block addresses to physical locations on a magnetic disk where host data is stored. Translation tables can be used by the disk drive to locate host data stored in the drive. In addition, the disk drive can be configured to store metadata information used by the disk drive to keep track of locations where host data is stored. For example, metadata for a particular track can include the mapping of logical addresses for which host data is stored on the track to physical addresses where host data is stored. Typically, the host system does not use metadata information. Instead, metadata information is used by the disk drive to locate host data stored in the disk drive.

In some embodiments of the present invention, a translation table of reduced size is maintained by a disk drive system. The disk drive can be configured to utilize an additional address mapping layer between the logical addresses used by the host system and physical locations in the disk drive. This additional mapping layer can relate the logical address used by the host system to another set of logical addresses utilized by the disk drive, which in turn correspond to physical locations in the disk drive. Logical addresses utilized by the disk drive exclude or skip some or all physical locations that are configured to store metadata. Accordingly, entries in the translation table can comprise logical addresses used by the host system along with corresponding logical addresses utilized by the disk drive. This approach permits the translation table to be smaller and, therefore, results in a more efficient storage and retrieval of data.

In some embodiments of the present invention, the disk drive can be configured to further reduce the size of the translation table by utilizing one or more suitable data encoding or compression schemes, such as run length compression or encoding, Huffman coding, etc. For example, the host system can store consecutive or sequential data values starting at a given logical address in the disk drive. The disk drive can be configured to store the sequential data values along with metadata, for example, in the magnetic disk storage beginning with a given physical location. According to some embodiments, the translation table can comprise a single entry that includes the given logical address used by the host system as the starting address, a logical address utilized by the disk drive corresponding to the given physical location where a first data value of the sequence is stored, and a number of data values in the sequence. Using this additional mapping layer that excludes some or all physical locations configured to store metadata allows the disk drive to reduce the size of the translation table by taking advantage of run length encoding when a consecutive run of host data is stored in the disk drive.

In some embodiments of the present invention, the disk drive can be configured to retrieve data requested by the host by using the translation table. The disk drive can determine a logical address utilized by the disk drive that corresponds to the logical address specified by host in connection with a read data operation. The disk drive can convert the logical address utilized by the disk drive to a corresponding physical location in accordance with a predetermined conversion process. For example, when metadata information is stored in predetermined locations in the disk drive (e.g., in starting and middle locations of each track), the conversion process can be a mapping, such as a simple transformation, of logical addresses utilized by the disk drive to physical addresses.

System Overview

FIG. 1 illustrates a disk drive 100 according to one embodiment of the invention. Disk drive 100 comprises a disk 102, an actuator arm 4, and a head 104 actuated radially over the disk 102 and connected to a distal end of the actuator arm 4. The disk 102 comprises a plurality of data tracks 10 and a controller 14 configured to control the actual arm 4 to position the head 104 over a target track.

In one embodiment, the disk 102 comprises a plurality of servo sectors $24_0$-$24_N$ that define the plurality of data tracks 10. The controller 14 processes the read signal to demodulate the servo sectors $24_0$-$24_N$ into a position error signal (PES). The PES is filtered with a suitable compensation filter to generate a control signal 26 applied to a voice coil motor (VCM) 110 which rotates the actuator arm 4 about a pivot in order to position the head 104 radially over the disk 102 in a direction that reduces the PES. The servo sectors $24_0$-$24_N$ may comprise any suitable position information, and in one embodiment, as is shown in FIG. 1B, each servo sector comprises a preamble 30 for synchronizing gain control and timing recovery, a sync mark 32 for synchronizing to a data field 34 comprising coarse head positioning information such as a track number, and servo bursts 36 which provide fine head positioning information. The coarse head position information is processed to position a head over a target track during a seek operation, and the servo bursts 36 are processed to maintain the head over a centerline of the target track while writing or reading data during a tracking operation.

In one embodiment, as is illustrated in FIG. 1C, the disk drive 100 is a shingled disk drive. A set 20 of data tracks 10 is depicted as being partially overlapped. For shingled disk drives, the head 104 can be configured to use a wider and stronger magnetic field when writing data as compared to the magnetic field used when reading data. Because a wider and stronger magnetic field is used when writing data, one or more adjacent tracks can be affected (e.g., partially or fully overwritten) when data is written to a particular track. Accordingly, while the data tracks 10 are not physically overlapping, they are represented as such in set 20 of FIG. 1C in order to illustrate that these tracks can be subjected to inter-track interference during writing.

Figure 2:
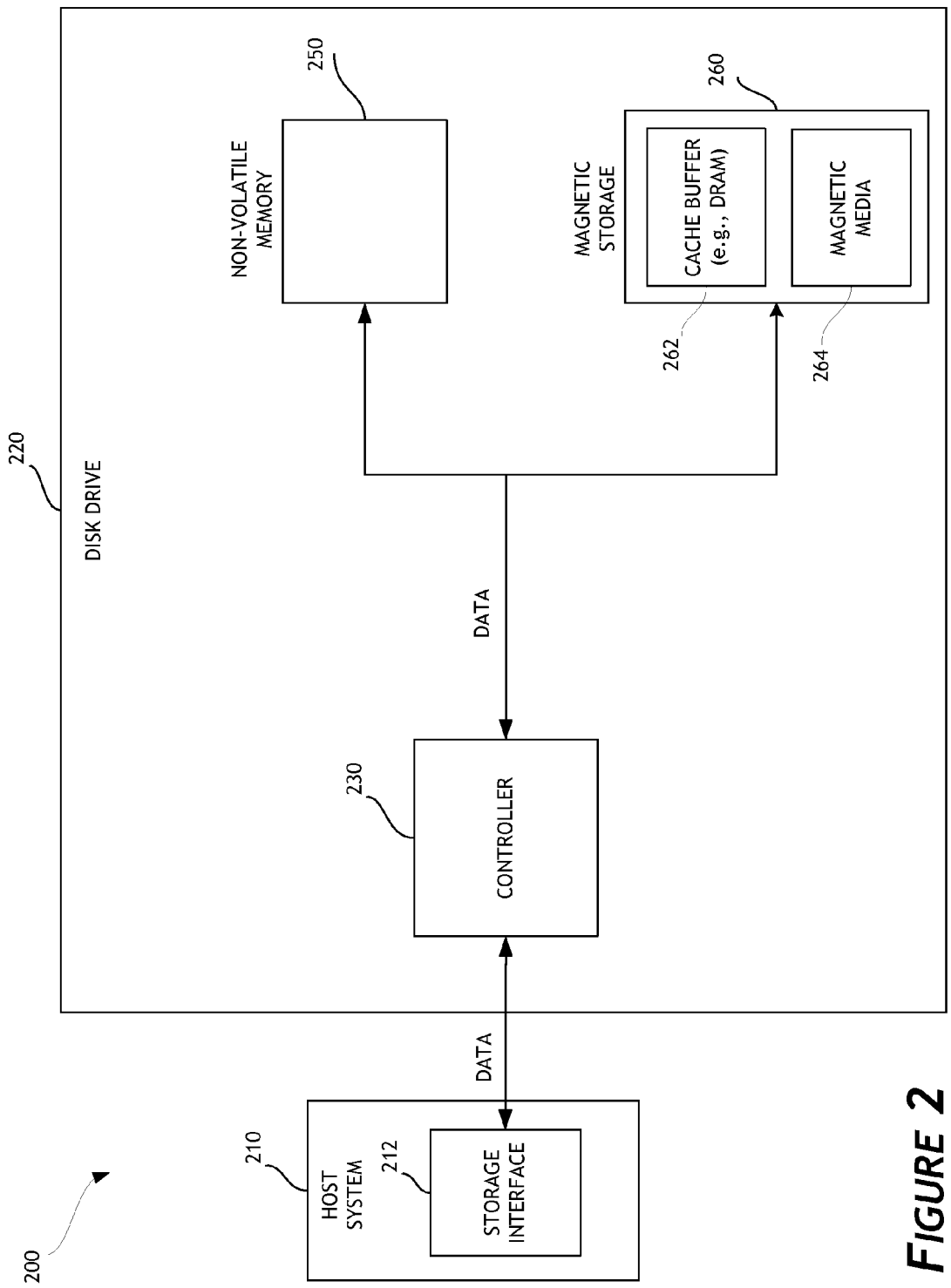
FIG. 2 illustrates a combination of a storage system and a host system according to one embodiment of the invention.

FIG. 2 illustrates a combination 200 of a storage system and a host system according to one embodiment of the invention. As is shown, a disk drive 220 (e.g., a shingled disk drive) includes a controller 230 and a magnetic storage module 260. The disk drive 220 optionally includes a non-volatile storage memory module 250. The magnetic storage module 260 comprises magnetic media 264 (e.g., one or more disks 102) and a cache buffer 262. The non-volatile memory module 250 can comprise one or more non-volatile solid-state memory arrays, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The cache buffer 262 can comprise volatile storage (e.g., DRAM, SRAM, etc.), non-volatile storage (e.g., non-volatile solid-state memory, etc.), or any combination thereof. In one embodiment, the cache buffer 262 can store system data, such as translation tables.

The controller 230 can be configured to receive data and/or storage access commands from a storage interface module 212 (e.g., a device driver) of a host system 210. Storage access commands communicated by the storage interface 212 can include write and read commands issued by the host system 210. Read and write commands can specify a logical address (e.g., LBA) in the disk drive 220. The controller 230 can execute the received commands in the non-volatile memory module 250 and/or in the magnetic storage module 260.

Disk drive 220 can store data communicated by the host system 210. In other words, the disk drive 220 can act as memory storage for the host system 210. To facilitate this function, the controller 230 can implement a logical interface. The logical interface can present to the host system 210 disk drive's memory as a set of logical addresses (e.g., contiguous address) where host data can be stored. Internally, the controller 230 can map logical addresses to various physical locations or addresses in the magnetic media 264 and/or the non-volatile memory module 250. In some embodiments, the controller 230 can map logical addresses used by the host system to logical addresses utilized by the disk drive (e.g., logical addresses exclude or skip physical locations configured to store metadata information), which in turn correspond to physical locations in the disk drive.

Examples of Memory Mapping

FIG. 3 illustrates a memory map 300 according to one embodiment of the invention. Although FIG. 3 illustrates a mapping for a shingled disk drive comprising magnetic storage, the mapping can be applied to other types of non-volatile storage, such as magnetic storage that does not utilize shingled techniques, solid-state storage, etc. The map 300 depicts tracks 0 through 3 divided into half track parts, as illustrated in rows B through G. The map 300 further depicts in columns L through R physical addresses (or absolute block addresses (ABA)) in the magnetic media 264 along with logical addresses utilized by the disk drive 220. Although these logical addresses are referred to as "ShABA" (or shingled absolute block addresses), those of ordinary skill in the art will recognize that other reference names and/or abbreviations may be used.

In the embodiment illustrated in FIG. 3, metadata or write log information is stored or configured to be stored in physical locations corresponding to the beginning and middle of a track in the magnetic media 264. Those of ordinary skill in the art will appreciate that metadata can be stored in any predetermined or random physical locations in the disk drive. Location 302 depicts the first physical location in track 0, which is configured to store metadata. This location corresponds to ABA 0. Because logical addresses utilized by the disk drive are configured to exclude or skip physical locations configured to store metadata, there is no ShABA address corresponding to location 302. The next location in the track, which is depicted by the intersection of row B and column M, corresponds to ABA 1 and ShABA 0. Location depicted by the intersection of row B and column N corresponds to ABA 2 and ShABA 1. Likewise, location depicted by the intersection of row B and column O corresponds to ABA 3 and ShABA 2. The next location, which is depicted as location 306 at the intersection of row B and column P, corresponds to ABA 4 and ShABA 3. In one embodiment, this location corresponds to a location that is defective. In other words, the disk drive does not store data in location 306. Those of ordinary skill in the art will appreciate that the disk drive may have no defective locations or may have more than one defective location.

Row C of FIG. 3 depicts addresses corresponding to locations in the next half track (i.e., second half of track 0). The first location of the half track 304 (i.e., location depicted by the intersection of row C and column L) corresponds to ABA 7. Because this location is configured to store metadata, it has no corresponding ShABA address. Subsequent locations in the half track have corresponding ABA and ShABA addresses as illustrated in FIG. 3. Rows D and E depict addresses corresponding to locations in the next track, track 1. Rows F and G depict addresses corresponding to locations in track 2. Memory map 300 illustrates physical addresses (e.g., ABA) 0 through 41 and corresponding logical addresses (e.g., ShABA) 0 through 35.

Figure 4A:
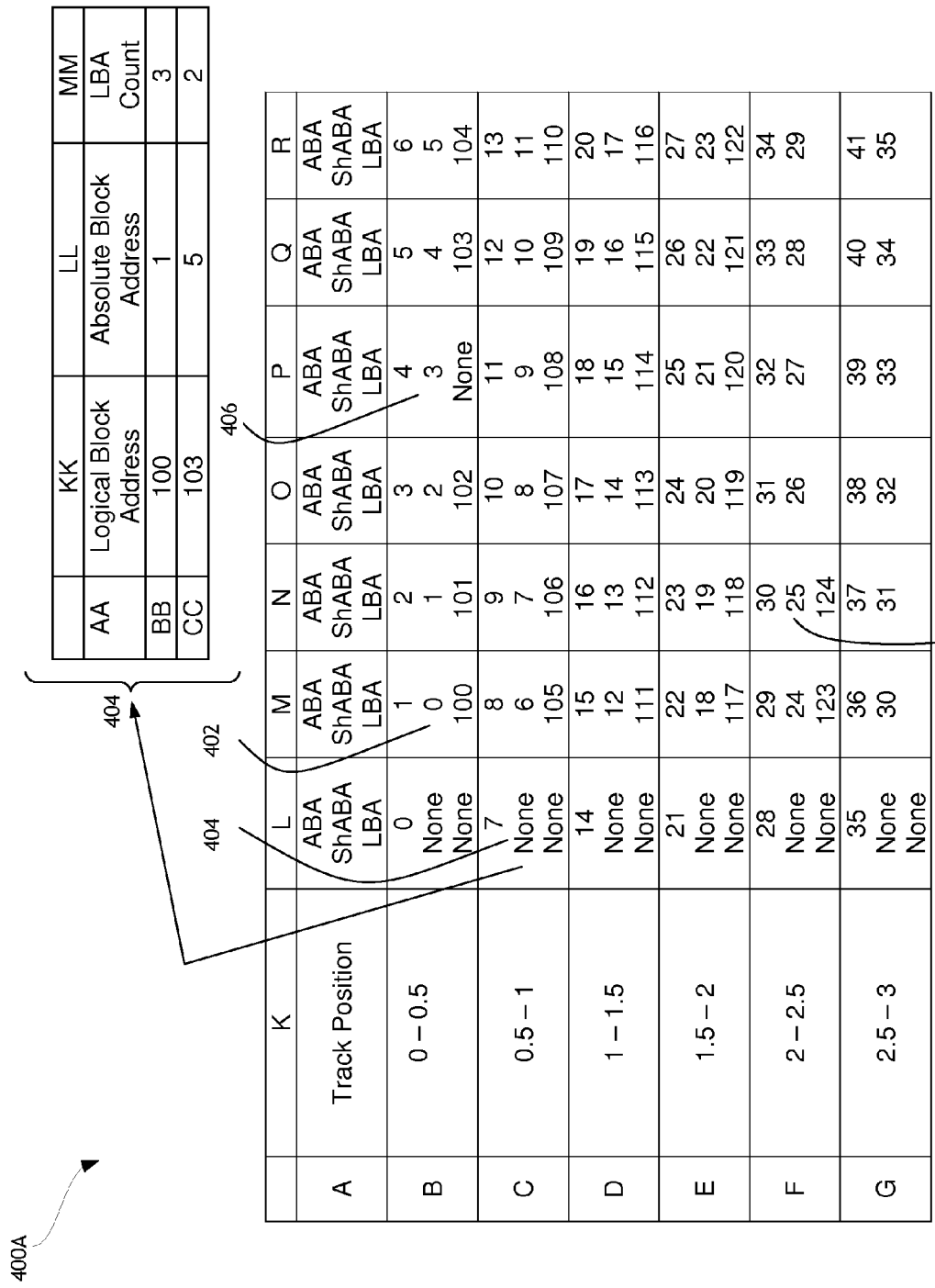
FIG. 4A illustrates a memory map corresponding to host data according to one embodiment of the invention.

FIG. 4A illustrates a memory map 400A corresponding to host data according to one embodiment of the invention. In particular, the memory map 400A corresponds to a memory layout for twenty-five sequential host data values beginning with LBA 100 and ending with LBA 124. This data can be stored in the disk drive in response to a write command received from the host. As is illustrated, these sequential host data values are stored in the disk drive 220 starting at a free physical location 402, which corresponds to ABA 1 and ShABA 0. In particular, physical location 402 stores host data associated with LBA 0. The next two physical locations (i.e., locations depicted by the intersections of row B and columns N and O respectively) store host data associated with LBA 1 and 2 respectively. Physical location 406 depicted by the intersection of row B and column P corresponds to a defective location, and, in one embodiment, no host data is stored there. Subsequent locations in the half track store host data associated with LBA 103 and 104, as is illustrated in FIG. 4A.

In the embodiment illustrated in FIG. 4A, metadata information is stored in physical locations corresponding to the beginning and middle of a track. Those of ordinary skill in the art will appreciate that metadata can be stored in any predetermined or random physical locations. Physical location 404, which corresponds to the start of half track and ABA 7, is configured to store metadata. Physical location 404 does not have a corresponding ShABA address. This location is also not configured to store host data.

In one embodiment, as is illustrated by the table stored in location 404, metadata information includes a mapping between logical addresses for which host data is stored on the half track and physical locations in the half track. Metadata information can be generated and stored in the disk drive (e.g., in the magnetic media 264) by the controller 230 when a write command received from the host is processed (e.g., host data is written to the disk drive). As is illustrated, metadata information includes a mapping for the previous half track. In other words, the mapping stored in location 404 depicts the data layout of the first half of track 0. In particular, the entry in row BB indicates that a sequence of three host data values beginning with LBA 100 (i.e., values corresponding to LBA 100-102) is stored in physical locations starting at ABA 1. Similarly, the entry in row CC indicates that a sequence of two host data values beginning with the next LBA in the sequence (LBA 103) is stored in physical locations starting at ABA 5. As is explained above, no host data is stored in the defective location 406 corresponding to ABA 4. Those of ordinary skill in the art will appreciate that metadata information can include a mapping for the current half track, current track, plurality of current or previous half tracks, tracks, etc. In addition, those of ordinary skill in the art will appreciate other suitable mapping techniques or combinations of such techniques can be used to generate metadata or write log information.

Row C of FIG. 4A depicts the layout for the remainder of the half track (i.e., second half of track 0). Rows D and E depict the layout for the next track, track 1. Rows F depicts the layout for the first half of track 2. Location 408, which corresponds to ABA 30 and ShABA 25, in the first half of track 2 stores the data value associated with LBA 124. Subsequent physical locations in track 2 are depicted as being empty (i.e., these locations do not store valid host data).

Reduced Size Translation Table

FIG. 4B illustrates a translation table 400B corresponding to the memory map of FIG. 4A according to one embodiment of the invention. Translation table 400B can be used by the disk drive 220 (e.g., by the controller 230) to locate host data stored in the disk drive. The controller 230 can be configured to generate and/or update the translation table 400B when processing write operation(s) received from the host system. In one embodiment, the controller 230 generates the translation table 400B when user data is initially stored in the disk drive. When subsequent write operations are received from the host system, the controller can update the translation table 400B. In particular, when host data specified by a write command is being stored in the disk drive, the controller 230 can generate and store metadata information, which can be interspersed with host data. The controller 230 can generate and/or update the translation table 400B in conjunction with storing host data in the disk drive. The controller 230 can generate and/or update the translation table 400B before storing host data, while storing host data, or after storing host data.

With reference to FIG. 4B, as is explained above, twenty-five sequential host data values beginning with LBA 100 and ending with LBA 124 are stored in the disk drive starting at a free physical location 402, which corresponds to ABA 1 and ShABA 0. Table 400B reflects the mapping between logical addresses used by the host system and physical locations where data corresponding to the logical addresses is stored. In addition, table 400B utilizes run length encoding for consecutive or sequential blocks of host data. Although a single translation table is illustrated, those of ordinary skill in the art will recognize that other translation tables can be utilized by the disk drive. In addition, although the translation table is depicted as a table, those of ordinary skill in the art will recognize that any suitable data structure can be used, such as a one dimensional array, multi-dimensional array, linked list, tree, graph, and the like.

With reference to FIG. 4A, three consecutive values corresponding to LBA 100-102 are stored in locations having ABA addresses 1-3, which is reflected by the entry in row B of FIG. 4B. No host data is stored in the defective location corresponding to ABA 4. The remainder of the half track comprises two consecutive data values corresponding to LBA 103 and 104 stored in locations having ABA addresses 5 and 6, which is reflected by the entry in row C of FIG. 4B. The next half track comprises six consecutive data values corresponding to LBA 105-110 stored in locations having ABA addresses 8-13, which is reflected by the entry in row D of FIG. 4B. Similarly, the next half track comprises six consecutive data values corresponding to LBA 111-116 stored in locations having ABA addresses 15-20, which is reflected by the entry in row E of FIG. 4B. Likewise, next half track comprises six consecutive data values corresponding to LBA 117-122 stored in locations having ABA addresses 22-27, which is reflected by the entry in row F of FIG. 4B. The last two data values corresponding to LBA 123 and 124 are stored in locations with ABA addresses 29 and 30, which is reflected by the entry in row G of FIG. 4B.

As is illustrated, physical locations configured to store metadata fragment or break-up entries in the translation table 400B. In other words, because metadata is interspersed with host data stored on the disk drive, sequential runs of host data are broken up by physical locations that store metadata. This fragmentation is reflected in table 400B. In addition, entries in table 400B are broken-up by the defective location 406 corresponding to ABA 4.

FIG. 4C illustrates a reduced size translation table 400C corresponding to the memory map of FIG. 4A according to one embodiment of the invention. As is illustrated, table 400C utilizes logical addresses used by the disk drive 220 (e.g., ShABA) instead of physical addresses (e.g., ABA). Because logical addresses used by the disk drive are configured to exclude or skip locations configured to store metadata, the size of table 400C is smaller than the size of table 400B. Using logical addressing (e.g., ShABA addressing) allows the disk drive to rejoin or defragment consecutive runs of host data values that are fragmented by metadata intermingled with host data on the disk drive (e.g., in the magnetic media 264). In other words, because logical addressing used by the disk drive does not account for physical locations configured to store metadata, stored metadata does not break up consecutive runs of host data. In one embodiment, logical addressing can exclude or skip metadata that is stored in physical locations according to a known or predetermined pattern (e.g., at the beginning and middle of each track). In another embodiment, logical addressing can in addition exclude or skip metadata that is stored in quasi-random or random physical locations.

As is illustrated in FIG. 4C, translation table 400C comprises two entries. The entry depicted in row B corresponds to a run of consecutive host data values associated with LBA 100-102 (3 consecutive data values), which are stored in physical locations having ShABA addresses 0-2. No host data is stored in the defective location corresponding to ShABA 3. The remaining host data values associated with LBA 103-124 (22 consecutive data values) are stored in physical locations having ShABA addresses 4-25, as is depicted in row C and in FIG. 4A. Accordingly, the translation table 400B, which comprises six entries, can be reduced to a two-entry translation table 400C, which captures the same information as that captured by the table 400B.

In one embodiment, the translation table (e.g., table 400B, 400C, etc.) can be stored or cached in volatile memory, such as cache buffer 262 (which can be implemented in DRAM in one embodiment), which can provide faster access to the table as compared to the table being stored only in the magnetic media 264. In another embodiment, the translation table can be stored in non-volatile memory 250. The disk drive can be further configured to store a working copy of the translation table in volatile memory, such as cache buffer 262 or non-volatile memory 250, while storing a second (e.g., backup) copy of the translation table in the magnetic media 264. When multiple copies of the translation table are used, the disk drive can be configured to periodically save the working copy of the translation table. For example, the controller 230 can be configured to save the working copy in a reserved area of the magnetic media 264.

Example of Using a Reduced Size Translation Table

Figure 5:
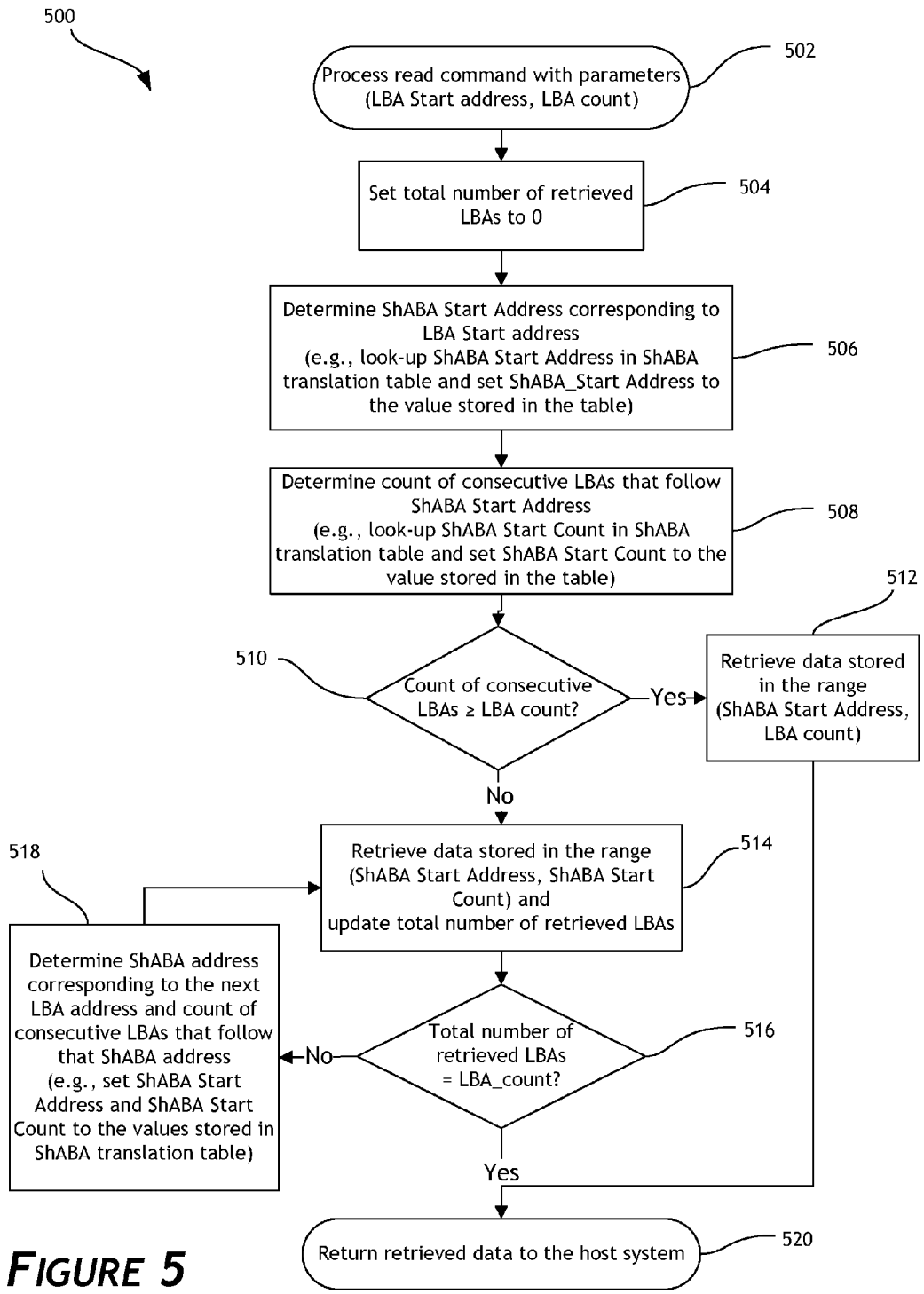
FIG. 5 illustrates a flow diagram for performing read operations according to one embodiment of the invention.

FIG. 5 illustrates a flow diagram 500 for performing read operations according to one embodiment. The process 500 can be executed by the controller 230. The process begins at 502 when the disk drive 220 receives a read command from the host system 210, the read data command being associated with a starting LBA address and a count of consecutive data values to be retrieved. In block 504 the process 500 sets a counter of retrieved data values to zero and transitions to block 506.

In block 506, the process 500 determines a logical address utilized by the disk drive (e.g., ShABA address) that corresponds to the starting LBA address associated with the read data command. In one embodiment, the process 500 can search the translation table 400C (e.g., perform a look-up operation) and determine the logical address corresponding to the starting LBA address. The process transitions to block 508 where it determines the number of consecutive host data values that follow the logical address corresponding to the starting LBA address (including the data value corresponding to the logical address).

In block 510, the process determines whether the count of consecutive data values to be retrieved is smaller than or equal to than the number of consecutive host data values that follow the logical address corresponding to the starting LBA address. If the count of consecutive data values is determined to be smaller or equal than the number of consecutive host data values, the process transitions to block 512. Otherwise, the process transitions to block 514.

In block 512, the process 500 retrieves data values consecutively stored beginning with the logical address corresponding to the starting LBA address. The number of consecutive data values retrieved corresponds to the count specified in block 502. In one embodiment, the process 500 can convert the logical address (e.g., ShABA address) corresponding to the starting LBA address to a physical address (e.g., ABA address) by using a predetermined conversion process. For example, as is explained above, logical addresses utilized by the disk drive can be mapped to corresponding physical addresses in the disk drive 220. Further, when metadata information is stored according to a known or predetermined pattern (e.g., in starting and middle locations of each track), the conversion process can be a simple transformation of logical addresses utilized by the disk drive to physical addresses. For mapping illustrated in FIG. 4A, this transformation satisfies the following equation:

$$\text{Physical address} = \text{Logical address utilized by disk drive} + n \quad (1)$$

where n corresponds to a half track number (selected from the set [1, N]) for the logical address utilized by the disk drive. Starting at the physical address corresponding to the logical address utilized by the disk drive, the process 500 retrieves a number of consecutively stored data values corresponding to the count specified in block 502. When the process completes the retrieval of host data, it transitions to 520 where data is communicated (e.g., returned) to the host system.

If the process 500 determines in block 510 that the count specified in block 502 is greater than the number of consecutive host data values that follow the logical address corresponding to the starting LBA address, the process transitions to block 514. In block 514, the process 500 converts the logical address corresponding to the starting LBA address to a physical address and retrieves host data stored in the disk drive beginning with that physical address. The process retrieves a number of consecutively stored data values corresponding to the number determined in block 508, and updates (e.g., increments) the counter of retrieved data values. The process transitions to block 516 where it determines whether the number of retrieved data values (as tracked by the counter) equals or exceeds the count specified in block 502. If the process determines that all data values requested by the host system have been retrieved, it transitions to block 520 where data is communicated (e.g., returned) to the host system.

If in block 516 the process 500 determines that it needs to retrieve more host data values stored in the disk drive, the process transitions to block 518. In block 518, the process determines the next logical address utilized by the disk drive. In one embodiment, the process 500 can search the translation table 400C and determine such next logical address. For example, the process can determine the next logical address as follows:

starting LBA address specified in block 502+number of consecutively stored data values determined in block 508.

Alternatively, the process 500 can determine the next logical address by looking-up the next entry in the table 400C. The process also determines the number of consecutive host data values that follow the next logical address (including the data value corresponding to the next logical address). The process transitions to block 514 where data is retrieved as explained above.

CONCLUSION

By using an additional address mapping layer between the logical addresses used by the host system and physical locations in the disk drive, a translation table of reduced size can maintained by the disk drive. In addition, the use of data encoding or compression schemes, such as run length encoding, can further reduce the size of the translation table. Maintaining a reduced-size translation table can result in more efficient data storage and retrieval. In addition, when a working copy of the translation table is stored in volatile memory, such as DRAM, volatile memory of a smaller size can be used, which results in cost savings. Moreover, by excluding or skipping physical locations configured to store metadata information from the additional mapping layer, metadata can be better concealed from the host system. For example, the host system may need to communicate a special (e.g., non-standard command) to access physical locations configured to store metadata information. This can provide better security for data stored in the disk drive.

OTHER VARIATIONS

Those skilled in the art will appreciate that in some embodiments, other techniques to reduce the size of translation tables can be implemented. In addition, the actual steps taken in the disclosed processes, such as the process shown in FIG. 5, may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and method disclosed herein can be applied to hybrid hard drives, solid state drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for processing storage operations received from a host system, the method performed by a disk drive system comprising a plurality of physical memory locations configured to store at least one of data received from the host system and metadata, the method comprising:

storing data received from the host system in a first set of physical memory locations;

storing metadata in a second set of physical memory locations designated for storing metadata and not data received from the host system;

maintaining a translation table configured to map a set of logical addresses to the first set of physical memory locations, the translation table having a reduced size due to excluding the second set of physical memory locations designated for storing metadata from the translation table; and in response to receiving from the host system a read operation associated with a logical address, using the reduced size translation table to retrieve data stored in a physical memory location in the disk drive corresponding to the logical address and communicating the retrieved data to the host system.

2. The method of claim 1, wherein using the translation table to retrieve data further comprises:

looking up in the translation table a value that corresponds to the logical address; and converting the value to the physical memory location in the disk drive corresponding to the logical address in accordance with a predetermined conversion process.

3. The method of claim 1, further comprising reducing the size of the translation table by:
in response to receiving from a host system a write operation associated with a starting logical address and a plurality of consecutive host data units, creating a single translation table entry comprising the starting logical address, a value corresponding to the starting logical address, and a count of the number of data units in the plurality of consecutive host data units, wherein the value corresponds to a starting physical memory location in the disk drive.

4. The method of claim 3, wherein the plurality of consecutive host data units and metadata associated with the plurality of consecutive host data units are stored in a plurality of consecutive physical memory locations beginning at the starting physical location.

5. The method of claim 1, wherein metadata is stored in predetermined physical memory locations in the disk drive.

6. The method of claim 5, wherein the disk drive system further comprises magnetic storage and metadata is stored in predetermined physical memory locations in the magnetic storage.

7. The method of claim 1, wherein the disk drive system comprises at least one track and metadata is stored in physical memory locations corresponding to a start and middle of the at least one track.

8. A shingled disk drive configured to process at least read and write operations received from a host system, the shingled disk drive comprising:
magnetic storage comprising a plurality of physical memory locations configured to store data, wherein a first set of physical memory locations is designated for storing data received from a host system and a second set of physical memory locations is designated for storing metadata and not data received from the host system; and
a controller configured to:
process a read operation associated with a starting logical address, the starting logical address corresponding to a physical memory location of the plurality of physical memory locations in the magnetic storage;
determine the physical memory location corresponding to the starting logical address using a translation table;
retrieve data stored in the physical memory location; and
communicate the retrieved data to the host system,
wherein the translation table comprises a plurality of entries mapping a set of logical addresses to the first set of physical memory locations and the translation table has a reduced size due to exclusion of the second set of physical memory locations designated for storing metadata from the translation table.

9. The shingled disk drive of claim 8, wherein the controller is further configured to:
look up in the translation table a value that corresponds to the starting logical address; and
convert the value to the physical memory location corresponding to the starting logical address in accordance with a predetermined conversion process.

10. The shingled disk drive of claim 8, wherein the controller is further configured to:
process a write operation associated with a logical address and a plurality of host data units;
determine a starting physical memory location for storing the plurality of consecutive host data units; and
write the plurality of consecutive host data units along with metadata information in consecutive physical memory locations beginning at the starting physical memory location.

11. The shingled disk drive of claim 10, wherein the starting physical memory location corresponds to a free physical memory location designated for storing data received from the host system.

12. The shingled disk drive of claim 10, wherein the controller is further configured to reduce the size of the translation table by updating the translation table with a single entry comprising the logical address, a value corresponding to the starting physical memory location, and a count of the number of data units in the plurality of consecutive data units.

13. The shingled disk drive of claim 8, wherein metadata is stored in predetermined physical memory locations in the magnetic storage.

14. The shingled disk drive of claim 8, wherein the magnetic storage comprises at least one track and metadata is stored in physical memory locations corresponding to a start and middle of the at least one track.

15. The shingled disk drive of claim 8, wherein:
at least some memory locations in the first set of physical memory locations in the magnetic storage comprise defective memory locations where data is not stored; and
entries in the translation table do not refer to any defective memory locations.

16. The method of claim 1, wherein:
in the reduced size translation table, first and second physical memory locations storing data received from the host system are represented as consecutive locations, the first and second physical memory locations being physically separated in a disk drive memory by a physical memory location designated for storing metadata.

17. The method of claim 1, further comprising reducing the size of the translation table by applying run length encoding to create a single translation table entry corresponding to a plurality of consecutive host data units received from the host system for storage in the disk drive.

18. The shingled disk drive of claim 8, wherein:
in the reduced size translation table, first and second physical memory locations storing data received from the host system are represented as consecutive locations, the first and second physical memory locations being physically separated in the magnetic storage by a physical memory location designated for storing metadata.

19. The shingled disk drive of claim 8, wherein the controller is further configured to reduce the size of the translation table by applying run length encoding to create a single translation table entry corresponding to a plurality of consecutive host data units received from the host system for storage in the magnetic storage.

* * * * *